(12) United States Patent  (10) Patent No.: US 7,243,360 B2
Hsu et al.  (45) Date of Patent: Jul. 10, 2007

(54) METHOD FOR REDUCING THE ALTITUDINAL ERRORS AND RUN-OUT OF A SPINDLE MOTOR AND A SLIM-TYPE SPINDLE MOTOR

(75) Inventors: Jin-juh Hsu, Taoyuan (TW); Chihchang Chen, Shindian (TW); Jiansan Lin, Keelung (TW)

(73) Assignee: Delta Electronics Inc., Taoyuan County (TW)

( * ) Notice: Subject to any disclaimer, the term of this patent is extended or adjusted under 35 U.S.C. 154(b) by 581 days.

(21) Appl. No.: 10/762,968

(22) Filed: Jan. 21, 2004

(65) Prior Publication Data
US 2004/0195922 A1 Oct. 7, 2004

(51) Int. Cl.
*G11B 17/028* (2006.01)
*H02K 7/00* (2006.01)

(52) U.S. Cl. ..................... 720/701; 310/67 R
(58) Field of Classification Search ........... 720/701; 310/67 R
See application file for complete search history.

(56) References Cited

U.S. PATENT DOCUMENTS

| 6,125,098 A * | 9/2000 | Osawa ................. 369/266 |
| 6,252,319 B1 * | 6/2001 | Sudo et al. ............ 310/67 R |
| 6,477,001 B1 * | 11/2002 | Yang et al. ........... 360/99.08 |
| 6,664,670 B2 * | 12/2003 | Kikuchi et al. .......... 310/51 |
| 6,965,492 B2 * | 11/2005 | Obata et al. .......... 360/99.08 |
| 2001/0024069 A1 * | 9/2001 | Yamaguchi ............ 310/67 R |

* cited by examiner

*Primary Examiner*—Allen Cao
(74) *Attorney, Agent, or Firm*—Birch, Stewart, Kolasch & Birch, LLP

(57) ABSTRACT

A method for reducing the altitudinal errors and run-out of a spindle motor is disclosed. The method includes the following steps. First is to mount a material layer on the loading surface. Then, a surface treatment is applied to the material layer until the average run-out of the surface of the material layer is below $10^{-2}$ mm during the running of the spindle motor, and the distance between the surfaces of the material layer and one end of a shaft of the spindle motor achieves an expected value.

19 Claims, 2 Drawing Sheets

METHOD FOR REDUCING THE ALTITUDINAL ERRORS AND RUN-OUT OF A SPINDLE MOTOR AND A SLIM-TYPE SPINDLE MOTOR

BACKGROUND OF THE INVENTION

1. Field of the Invention

The invention relates to a method for improving manufacturing accuracy of a spindle motor and, more particularly, to a method for improving altitude and run-out of a slim-type spindle motor.

2. Description of the Related Art

Prosperity in information development has propelled the significance of developing information storage medium. Regarding to information storage medium, a spindle motor has been playing a major role in the field. A spindle motor is a small motor, which mostly functions as a driving device for activating operation of information storage medium such as compact disk drive and hard disk drive. The types of spindle motor may vary, but the primary components of all types of spindle motor are the same, including a loading surface, a rotating shaft, a rotor, and a stator. Among them, a loading surface can be the surface of a loading disk that is independently provided or the surface of a motor rotor itself, and both of them can be used for loading or activating a hard disk or compact disk. On the other hand, manufacturing for spindle motors has been turned to miniaturization actuated by the more precise modern manufacturing techniques. For instance, FIGS. 1 & 2 represent a perspective diagram and a sectional diagram along the line A—A of FIG. 1 respectively according to a conventional slim-type spindle motor.

As shown in FIGS. 1 & 2, a slim-type spindle motor is composed of several parts of components. Also, because the spindle motor's volume is small and its running speed can reach thousands of rotations per minute (rpm), normally there will be some requirements made to raise processing accuracy for each component of the spindle motor so that big vibrations can be avoided when the disk is in operation. Through the requirements, data reading on the disk will not be affected, nor will the optical read head be damaged. However, doing so can also increase the manufacturing cost. Besides, since a spindle motor comprises several parts of components, it is inevitable to accumulate assembly errors while assembling components for each part. Unfortunately, these accumulated errors can seriously decrease the stability of overall spindle motor operation.

To illustrate the above-mentioned drawback, the spindle motor 10 shown in FIG. 1 will be taken as an example. As shown in FIG. 1, the loading surface 11 is a surface of motor rotor 13, and an anti-sliding slice 14 is adhered to the motor rotor 13 thereon to prevent the disk from sliding. Besides, there are other components of spindle motor 10, including a shaft 12, a cap 15, a base 16, a driving circuit 17, a stator base 18 (shown in FIG. 2), windings 19 (shown in FIG. 2), and a permanent magnet 20 (shown in FIG. 2). After the assembly has been done, the vertical errors between the loading surface 11 of the slim-type spindle motor 10 and the shaft 12, the manufacturing errors residing in the spindle motor 10 itself, and the existing assembly errors are all possible to cause a run-out when the spindle motor 10 is running; that is, when rotating, the loading surface 11 can result in a run-out corresponding to the shaft 12. In other words, the aforementioned errors can lower the product yield.

On the other hand, concerning about the applicability of a conventional slim-type spindle motor, a designer of the spindle motor has to diminish the volume of the motor. Therefore, besides that the altitude of the spindle motor being placed inside the disk drive has to be diminished, the altitude also has to be precisely controlled so that the relative positions among the spindle motor, the disk, and the read head can be fixed to facilitate a precise read head's reading data from the disk. In brief, the altitude accuracy of a slim-type spindle motor being placed inside the disk drive is essential.

However, there is usually no need to install any independent loading disk for the case of the slim-type spindle motor. Instead, the surface of the motor rotor will be used directly as a loading surface. Under such circumstances, it will be labor consuming and time consuming to try to solve the aforementioned run-out problem of the loading surface and try to precisely control the altitude accuracy of the spindle motor. Therefore, it is the subject for us to look for an easy and accessible method to improve altitude accuracy of the spindle motor as well as to reduce run-out of a loading surface in a short time.

SUMMARY OF THE INVENTION

The invention is to simultaneously solve the aforementioned two problems, including altitude accuracy and run-out of a conventional slim-type spindle motor.

Therefore, the object of the invention is to provide an accessible method capable of reducing the altitudinal errors and run-out of the loading surface of a spindle motor.

Another object of the invention is to provide a slim-type spindle motor having a material layer used to reduce even eliminate the accumulated errors occurred in assembling the spindle motor and to increase altitude accuracy of the spindle motor so that the stability of spindle motor while running can be enhanced.

The method disclosed in the invention is to mount a material layer on the loading surface of the spindle motor, and then apply a surface treatment to the material layer until the average run-out of the surface of the material layer is below $10^{-2}$ mm during spindle motor's running and the distance between one end of a shaft of the spindle motor and the surface of the material layer reaches an expected value.

In the invention, the material for the mounted material layer is selected from the group comprising polymer material, metal material, and compound material, and the polymer material can be either polycarbonate or polyethylene terephthalate (PET).

In the invention, when applying a surface treatment to the material layer, the shaft of the spindle motor is employed as a working spindle.

Also, a step of mounting an anti-sliding slice on the material layer is further included in the invention.

On the other hand, a slim-type spindle motor manufactured according to the method provided by the invention at least includes a shaft, a rotor with a hole provided in the middle of the rotor for accommodating the shaft; a material layer mounted on the surface of the rotor and undergone a surface treatment, and an anti-sliding slice mounted on top of the material layer.

The advantages of the method for reducing the altitudinal errors and run-out of the spindle motor provided by the invention will be described as below. First, through mounting the material layer and applying processing treatment to the layer, the influence on the system imposed by the manufacturing errors generated by the spindle motor's components and the accumulated errors after the assembly are eliminated. As a result, the standard requirements made to achieve processing accuracy of the spindle motor's components can be slightly reduced, thereby saving the manufacturing cost and time. Second, after the assembly has been done to the spindle motor's components of each part, the vertical errors between the loading surface of the spindle motor and the shaft, the manufacturing errors residing in the spindle motor itself, and the existing assembly errors can all be eliminated through the mounting and processing of the material layer. Therefore, run-out will not be occurred when the loading surface is rotating relative to the shaft, and thus the product yield can be enhanced. Third, besides the aforementioned effect of eliminating assembly error, the invention can precisely compensate for the altitude accuracy of the spindle motor without needing any independent loading disk. Fourth, Comparing to the conventional method that applies various tools to calibrate run-out and altitude, the method of the invention is better in saving time and cost because it is more simplified and accessible than the conventional method.

DETAILED DESCRIPTION OF THE PREFERRED EMBODIMENTS

The method for reducing the altitudinal errors and run-out of the spindle motor of the invention will be described in detail with reference to the accompanying drawings.

Figure 1:
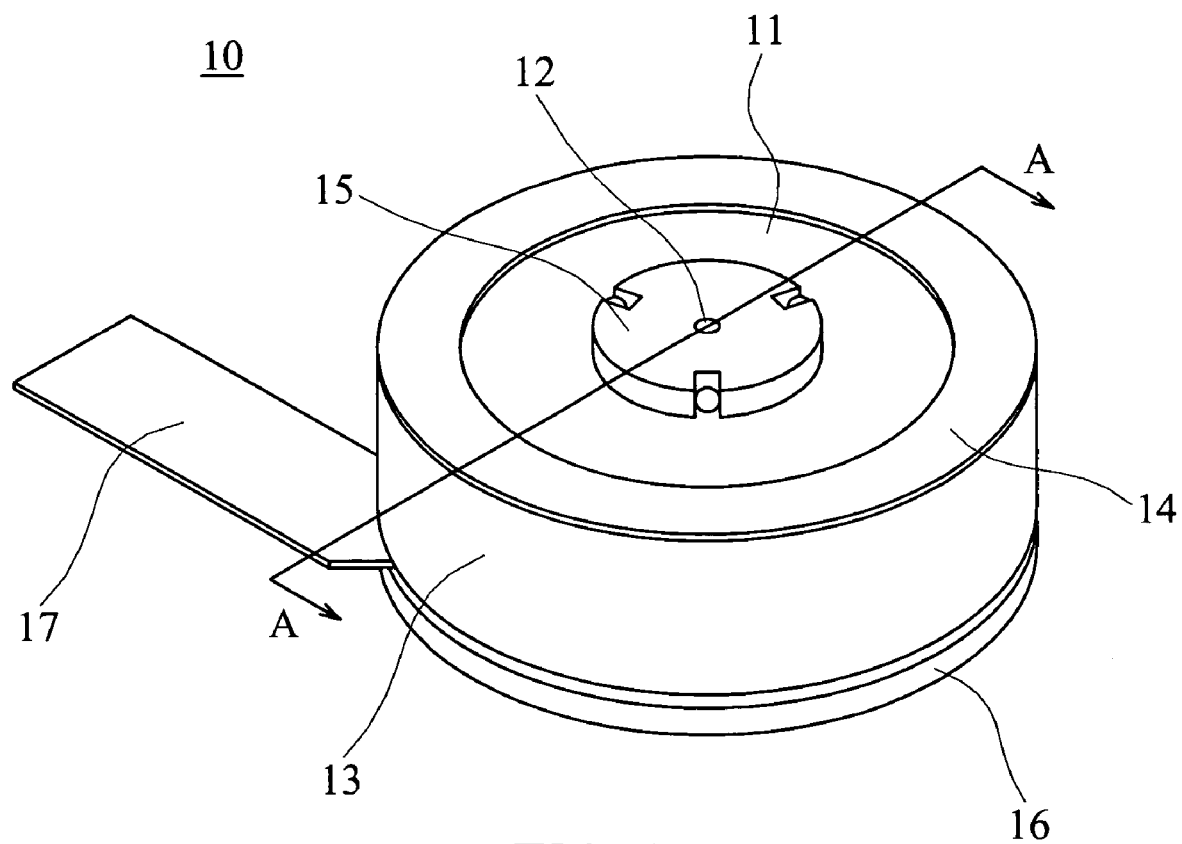
FIG. 1 is a perspective view schematically showing a conventional slim-type spindle motor.
Figure 2:
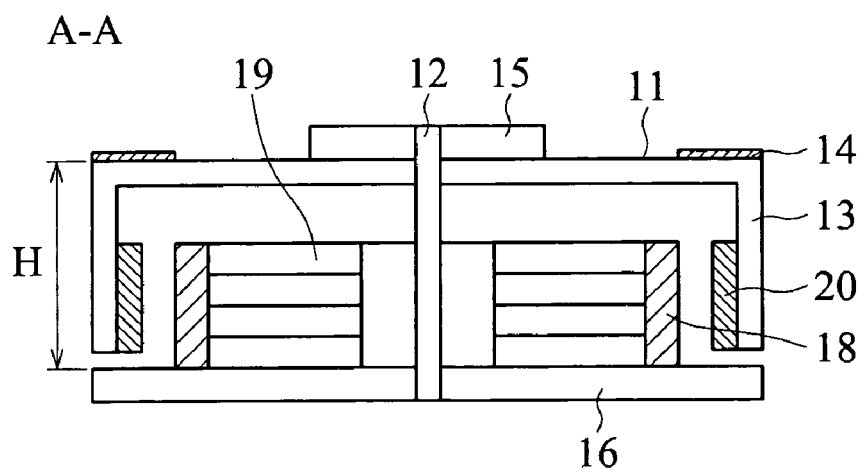
FIG. 2 is a cross sectional view along line A—A of FIG. 1 showing the slim-type spindle motor.
Figure 3:
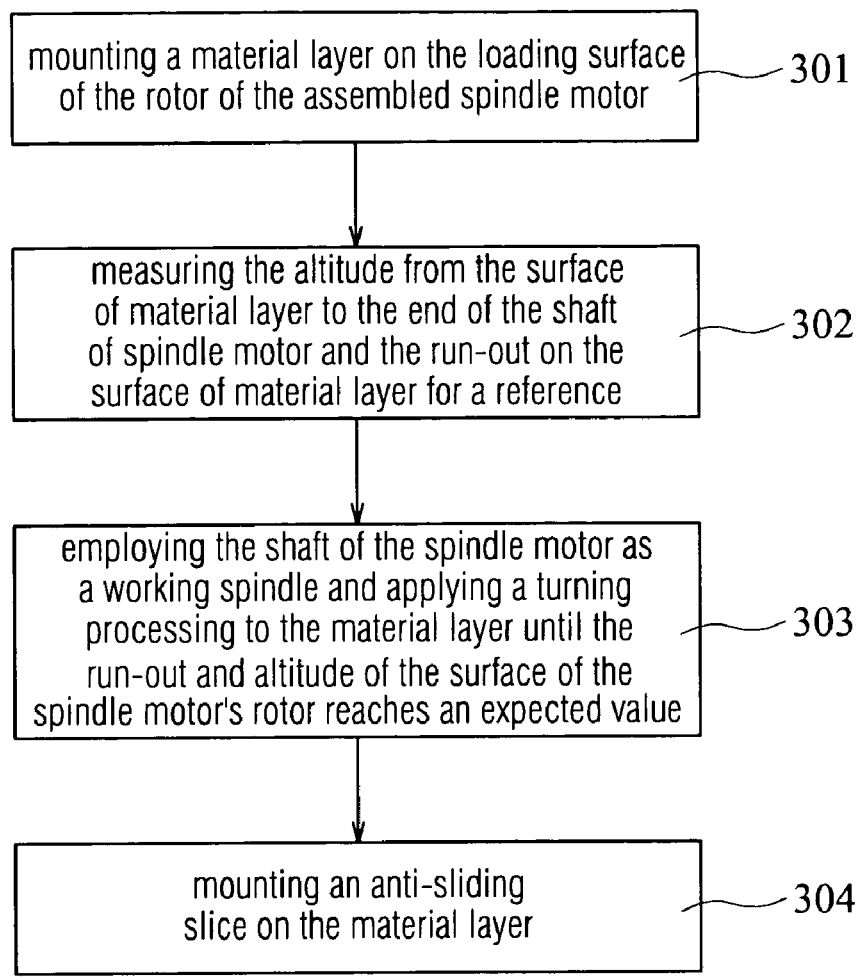
FIG. 3 is a flow chart illustrating the implemented procedures for reducing the altitudinal errors and run-out of the spindle motor according to one embodiment of the invention.

Referring to FIG. 3, a method provided in one embodiment of the invention includes implemented procedures from 301 to 304. First, the step 301 is to mount a material layer on the loading surface of an already assembled spindle motor. Herein, a polymer material layer (referred as 200 in FIG. 4), such as a material selected from a group material composed of polycarbonate or polyethylene terephthalate (PET), is mounted on the surface of the rotor. Next, the step 302 is to measure the altitude from the surface of polymer material layer to the end of the shaft of spindle motor and to measure the run-out on the surface of the polymer material layer so as to use the measured values as a reference. Then, the step 303 is to apply a surface treatment to the polymer material layer. Herein, the shaft of the spindle motor is employed as a working spindle and a cutting process is applied to the polymer material layer, such as a turning, until the run-out and altitude (i.e., the H' shown in FIG. 4, which is the distance between the surface of the rotor and the shaft end located at the stator) of the surface of the spindle motor's rotor reaches an expected value. Finally, the step 304 is to mount an anti-sliding slice on the polymer material layer.

In the above embodiment, thickness of the mounted polymer material layer is between 0.4 mm and 0.5 mm, and thickness of the mounted anti-sliding slice is between 0.4 mm and 0.5 mm.

In addition, an adhesive, for instance, can be applied for mounting the polymer material layer in the embodiment.

The following Table 1 illustrates the run-out and altitude values of ten sets of spindle motor's respectively under two different conditions: before employing cutting process of the embodiment and after employing cutting process of the embodiment.

TABLE 1

| Tested set | Status | | | |
|---|---|---|---|---|
| | Before Cutting | | After Cutting | |
| | Run-out (mm) | Altitude H (mm) | Run-out (mm) | Altitude H' (mm) |
| 1 | 0.070 | 16.397 | 0.008 | 16.341 |
| 2 | 0.021 | 16.414 | 0.008 | 16.336 |
| 3 | 0.058 | 16.416 | 0.009 | 16.336 |
| 4 | 0.063 | 16.393 | 0.012 | 16.335 |
| 5 | 0.025 | 16.407 | 0.004 | 16.335 |
| 6 | 0.049 | 16.406 | 0.014 | 16.333 |
| 7 | 0.040 | 16.398 | 0.010 | 16.343 |
| 8 | 0.027 | 16.404 | 0.007 | 16.341 |
| 9 | 0.043 | 16.424 | 0.014 | 16.342 |
| 10 | 0.060 | 16.419 | 0.013 | 16.344 |
| Average value | 0.046 | 16.408 | 0.010 | 16.339 |
| Standard deviation | 0.017 | 0.010 | 0.003 | 0.004 |

It can be proved from the above-mentioned experimental values that the average run-out of the surface of a slim-type spindle motor's rotor can be reduced from about 0.04 mm to 0.01 mm according to the method applied in the embodiment, and the standard deviation of altitude from one end of the spindle motor's shaft to the surface of its rotor can be reduced from about 0.01 mm to 0.004 mm. In this manner, not only can the assembly error between the rotor and shaft be reduced, but the stability of the surface of the slim-type spindle motor's rotor when rotating can also be enhanced.

It should be noted that in the method of the invention, the material layer available to be mounted on the rotor of a spindle motor is not limited to the polymer material only. In lieu, other materials that are suitable for surface treatment such as flexible metal material and compound material can be good selections as well. Likewise, the surface treatment applied to the material layer is not limited to cutting processing only. In lieu, other types of processing such as grinding treatment, laser treatment, and etching treatment can be applied as well. In other words, various processing methods can be selected according to the varying characteristics of mounted material layers so that the run-out and altitude (i.e., the H' shown in FIG. 4, which is the distance between the surface of the rotor and the shaft located at the stator) of the surface of the spindle motor's rotor can reach an expected value.

Figure 4:
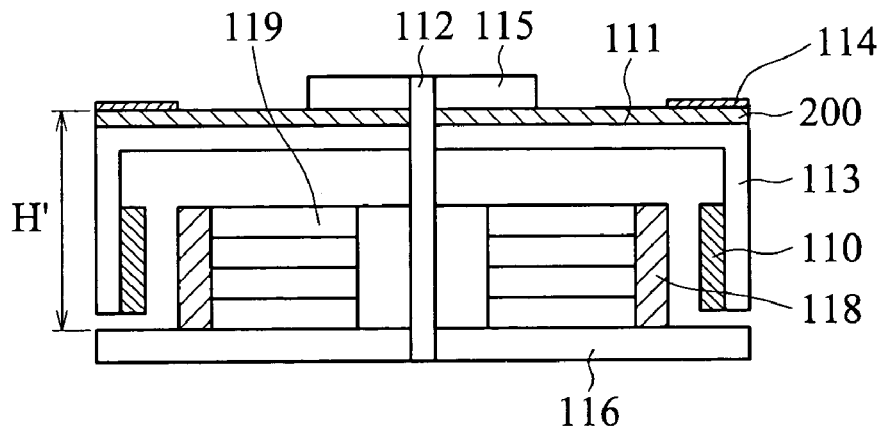
FIG. 4 is a cross sectional view schematically showing the slim-type spindle motor in accordance with one embodiment of the invention.

Referring to FIG. 4, the completed slim-type spindle motor according to the method in the embodiment includes a base 116; a stator 118 with windings 119; a shaft 112; a rotor 113 with a permanent magnetic 110; and a cap 115, wherein a material layer 200 and an anti-sliding slice 114 are mounted on the surface 111 of the rotor 113.

The embodiments above are only intended to illustrate the invention; they do not, however, to limit the invention to the specific embodiments. Accordingly, various modifications and changes may be made without departing from the spirit and scope of the invention as described in the appended claims.

What is claimed is:

1. A method for reducing the altitudinal errors and run-out of a spindle motor for an information storage device having a loading surface, comprising the following steps:
   Mounting a material layer on the loading surface; and
   Applying a surface treatment to the material layer until the average run-out of the surface of the material layer generated during spindle motor's running achieves a first expected value, and the distance between the surface of the material layer and one end of a shaft of the spindle motor achieves a second expected value.

2. The method for reducing the altitudinal errors and run-out of a spindle motor for an information storage device as claimed in claim 1, wherein the material for the mounted material layer comprises a material selected from the group comprising polymer material, metal material, and compound material.

3. The method for reducing the altitudinal errors and run-out of a spindle motor for an information storage device as claimed in claim 1, wherein the step of mounting the material layer on the loading surface is done by an adhesive.

4. The method for reducing the altitudinal errors and run-out of a spindle motor for an information storage device as claimed in claim 1, wherein the step of applying a surface treatment to the material layer is done with the shaft employed as a working spindle.

5. The method for reducing the altitudinal errors and run-out of a spindle motor for an information storage device as claimed in claim 1, wherein the surface treatment is turning.

6. The method for reducing the altitudinal errors and run-out of a spindle motor for an information storage device as claimed in claim 1, further comprising the following step:
   mounting an anti-sliding slice on the material layer.

7. The method for reducing the altitudinal errors and run-out of a spindle motor for an information storage device as claimed in claim 1, wherein the first expected value is below $10^{-2}$ mm.

8. The method for reducing the altitudinal errors and run-out of a spindle motor for an information storage device as claimed in claim 1, wherein the standard deviation of the second expected value is below $4 \times 10^{-3}$ mm.

9. A method for reducing the altitudinal errors and run-out of a spindle motor for an information storage device, comprising the following steps:
   Providing a spindle motor having a rotor and a shaft;
   mounting a material layer on the surface of the rotor; and
   employing the shaft as a working spindle and applying a mechanic processing on the surface of the material layer until the average run-out of the surface of the material layer generated during spindle motor's running achieves a first expected value, and the distance between the surface of the material layer and the end of the shaft achieves a second expected value.

10. The method for reducing the altitudinal errors and run-out of a spindle motor for an information storage device as claimed in claim 9, wherein the material of the material layer comprises a polymer material.

11. The method for reducing the altitudinal errors and run-out of a spindle motor for an information storage device as claimed in claim 10, wherein the polymer material layer comprises a material selected from the group comprising polycarbonate (PC) and polyethylene terephthalate (PET).

12. The method for reducing the altitudinal errors and run-out of a spindle motor for an information storage device as claimed in claim 9, wherein the mechanic processing comprises a cutting processing.

13. The method for reducing the altitudinal errors and run-out of a spindle motor for an information storage device as claimed in claim 12, wherein the cutting processing comprises turning.

14. The method for reducing the altitudinal errors and run-out of a spindle motor for an information storage device as claimed in claim 9, further comprising the following step:
   mounting an anti-sliding slice on the material layer.

15. The method for reducing the altitudinal errors and run-out of a spindle motor for an information storage device as claimed in claim 9, wherein the first expected value is below $10^{-2}$ mm.

16. The method for reducing the altitudinal errors and run-out of a spindle motor for an information storage device as claimed in claim 9, wherein the standard deviation of the second expected value is below $4 \times 10^{-3}$ mm.

17. A slim-type spindle motor for an information storage device, including:
   a shaft;
   a rotor, wherein a hole is provided in the middle of the rotor for accommodating the shaft;
   a material layer mounted on the surface of the rotor with the surface of the material layer being surface treated; and
   an anti-sliding slice mounted on the material layer.

18. The slim-type spindle motor for an information storage device as claimed in claim 17, wherein the average run-out of the surface of the material layer is below $10^{-2}$ mm, and the distance between the surface of the material layer and one end of the shaft achieves an expected value.

19. The slim-type spindle motor for an information storage device as claimed in claim 17, wherein the material of the material layer comprises a material selected from the group comprising polymer material, metal material, and compound material.

* * * * *